United States Patent
Chen et al.

(10) Patent No.: US 9,836,513 B2
(45) Date of Patent: Dec. 5, 2017

(54) PAGE FEED FOR EFFICIENT DATAFLOW BETWEEN DISTRIBUTED QUERY ENGINES

(75) Inventors: Qiming Chen, Cupertino, CA (US); Meichun Hsu, Los Altos Hills, CA (US)

(73) Assignee: EntIT Software LLC, Sunnyvale, CA (US)

( * ) Notice: Subject to any disclaimer, the term of this patent is extended or adjusted under 35 U.S.C. 154(b) by 991 days.

(21) Appl. No.: 13/418,055

(22) Filed: Mar. 12, 2012

(65) Prior Publication Data
US 2013/0238656 A1 Sep. 12, 2013

(51) Int. Cl.
*G06F 17/30* (2006.01)

(52) U.S. Cl.
CPC .............. *G06F 17/30575* (2013.01)

(58) Field of Classification Search
CPC ......... G06F 17/30448; G06F 17/30469; G06F 17/30336; G06F 17/30864; G06F 17/30474; G06F 17/30589; G06F 17/30902; G06F 17/30424
See application file for complete search history.

(56) References Cited

U.S. PATENT DOCUMENTS

| | | | |
|---|---|---|---|
| 5,408,653 A * | 4/1995 | Josten | G06F 17/30362 707/999.008 |
| 5,933,593 A * | 8/1999 | Arun | G06F 11/1451 711/126 |
| 6,014,732 A * | 1/2000 | Naffziger | G06F 12/1045 711/118 |
| 6,557,082 B1 * | 4/2003 | Josten | G06F 12/0815 707/999.201 |
| 6,879,266 B1 * | 4/2005 | Dye et al. | 341/51 |
| 6,889,234 B1 * | 5/2005 | Li | G06F 17/30345 707/999.002 |
| 7,747,610 B2 | 6/2010 | Chinchwadkar et al. | |
| 7,788,260 B2 * | 8/2010 | Lunt | G06F 17/30864 707/727 |
| 8,001,162 B2 | 8/2011 | Dexter | |
| 8,090,751 B2 | 1/2012 | Saffer et al. | |
| 2003/0065874 A1 * | 4/2003 | Marron et al. | 711/100 |
| 2004/0073630 A1 * | 4/2004 | Copeland et al. | 709/218 |
| 2004/0143562 A1 * | 7/2004 | Chen et al. | 707/1 |
| 2004/0193656 A1 | 9/2004 | Pizzo et al. | |
| 2008/0065644 A1 * | 3/2008 | Pasupuleti | G06F 17/30551 707/999.01 |
| 2009/0292877 A1 | 11/2009 | Piper et al. | |

(Continued)

OTHER PUBLICATIONS

Anil Nori, Distributed Caching Platforms, Proceedings of the VLDB Endowment VLDB Endowment Hompage archive, vol. 3, Issue 1-2, Sep. 2010, pp. 1645-1646.

(Continued)

*Primary Examiner* — Ashish K Thomas
*Assistant Examiner* — Rezwanul Mahmood (57) ABSTRACT

Page feed for efficient dataflow between distributed query engines is disclosed. An example method comprises storing a query result relation by a producer query as pages in a query engine buffer pool, and then sending these pages to a distributed caching platform (DCP) as the data source of another query. The example method also includes reading the result relation by a consumer query from the page stored in the DCP.

20 Claims, 8 Drawing Sheets

(56) References Cited

U.S. PATENT DOCUMENTS

| | | | | |
|---|---|---|---|---|
| 2010/0174047 A1* | 7/2010 | Jung | ................ | C01B 3/001 528/395 |
| 2011/0035369 A1* | 2/2011 | Halasipuram | ..... | G06F 17/30474 707/720 |
| 2011/0307736 A1* | 12/2011 | George et al. | ................ | 714/6.2 |
| 2012/0095955 A1* | 4/2012 | Koshy | ................ | G06N 5/02 706/55 |
| 2012/0303901 A1* | 11/2012 | Chen | ................ | G06F 12/0806 711/126 |
| 2013/0290636 A1* | 10/2013 | Chen | ................ | G06F 12/0811 711/122 |

OTHER PUBLICATIONS

Arasu et al., "The CQL Continuous Query Language: Semantic Foundations and Query Execution," The VLDB Journal—The International Journal on Very Large Data Bases, vol. 15 Issue 2, Jun. 2006, pp. 121-142.

Abadi et al., "The design of the Borealis stream processing engine," In 2nd Biennial Conference on Innovative Data Systems Research, CIDR 2005, pp. 277-289.

Chen et al., "Experience in Continuous analytics as a Service (CaaaS)", Proceedings of the 14th International Conference on Extending Database Technology, pp. 509-514, Uppsala, Sweden, Mar. 21-24, 2011.

Franklin et al., "Continuous Analytics: Rethinking Query Processing in a Network-Effect World", CIDR Perspectives 2009, 6 pages.

"IBM Websphere Extreme Scale Cache", 2013, retrieved from https://web.archive.org/web/20131122110345/http://www-03.ibm.com/software/products/en/appserv-was.

Liarou et al."Exploiting the Power of Relational Databases for Efficient Stream Processing", Proceedings of the 12th International Conference on Extending Database Technology: Advances in Database Technology, pp. 323-334, 2009.

Baer et al., "On the inclusion properties for multi-level cache hierarchies," ISCA '88 Proceedings of the 15th Annual International Symposium on Computer Architecture, pp. 73-80, May 30, 1988-Jun, 2, 1988.

Membase Server: Scale Out Your Data Quickly with Membase, Couchbase, retrieved from: http://web.archive.org/web/20111006051443/http://www.couchbase.com:80/products-and-services/membase-server, 2011.

Distributed Innodb Caching with memcached—Internet & Technology, Research, and MySQL, retrieved from: http://web.archive.org/web/20090625155859/http://www.scribd.com:80/doc/14603868/Distributed-Innodb-Caching-with-memcached, 2009.

WaffleFAQ, the Waffle Grid Project, retrieved from http://web.archive.org/web/20100414225420/http://www.wafflegrid.com:80/wiki/index.php?title=WaffleFAQ, 2008.

Anand et al., Cloud Cache—Introducing the Windows Azure AppFabric Caching Service, MSDN Magazine, retrieved from: http://web.archive.org/web/20110924213118/http://msdn.microsoft.com:80/en-us/magazine/gg983488.aspx, Apr. 2011.

Xap-Product Architecture, GigaSpaces.com Application Server, retrieved from: https://web.archive.org/web/20111013191733/http://www.gigaspaces.com:80/xap, 2010.

VMware vFabric GemFire: Elastic Data Management for Virtualized and Cloud-Based Applications, retrieved from: https://web.archive.org/web/201110074949/http://www.vmware.com/products/vfabric-gemfire/overview.html, 2011.

Terracotta Products, Enterprise Ehcache Performance at any scale, retrieved from: https://web.archive.org/web/20111008010824/http://terracotta.org/products/enterprise-ehcache, 2011.

Memcached—A Distributed Memory Object Caching System, retrieved from: https://web.archive.org/web/20111001034050/http://www.memcached.org:80/, 2011.

* cited by examiner

PAGE FEED FOR EFFICIENT DATAFLOW BETWEEN DISTRIBUTED QUERY ENGINES

BACKGROUND

While the use of Distributed Caching Platform (DCP) has gained in popularity, the DCP lacks a common semantic interface such as Structured Query Language (SQL), a unified data model such as a relation model, and Database Management System (DBMS) capabilities. Sharing and exchanging query results tuple-by-tuple is often inefficient because the granularity of cache access is too small. In addition, data communication at the application level relies on peer-to-peer protocols and often incurs significant overhead in data conversion and interpretation.

BRIEF DESCRIPTION OF THE DRAWINGS

FIG. 1 are high-level diagrams illustrating (a) an example SQL dataflow process with three queries Q1-Q3, and (b) a Query Engine (QE) net allocated to execute the process.

DETAILED DESCRIPTION

Page feed for efficient dataflow between distributed query engines is disclosed. An example uses DCP to scale out database applications and to support relational data communication of multiple individual Query Engines (QEs) in a general graph-structured SQL dataflow process. In an example, DCP is implemented to scale-out the database buffer pool over multiple memory nodes to enable low-latency access to large volumes of data. The solution may be extended to multiple distributed QEs to provide a shared memory-based paradigm in a SQL dataflow process. A page-feed mechanism enables query results of collaborative QEs to be communicated as data pages (e.g., blocks). For example, the producer query stores a result relation as pages in the DCP to be read by the consumer query. In this way, data is transferred as pages directly under binary protocol, the contained tuples are presented in the format needed by the relational operators, and an appropriate page size provides balanced efficiency of DCP access and query processing. Pushing relation data communication down to storage level (e.g., a buffer pool) from the application level offers significant performance gain, and is consistent with SQL semantics.

Before continuing, it is noted that as used herein, the terms "includes" and "including" mean, but is not limited to, "includes" or "including" and "includes at least" or "including at least." The term "based on" means "based on" and "based at least in part on."

In-DB analytics offers the benefits of fast data access, reduced data transfer and the rich expressive power of SQL. However, a general graph-structured dataflow cannot be readily modeled using a single tree-structured SQL query. However, the dataflow can be modeled using a process with multiple correlated queries. In general, a SQL dataflow process is graph-structured with multiple queries connected in the graph to form sequential, parallel or conditional steps.

Figure 1A:
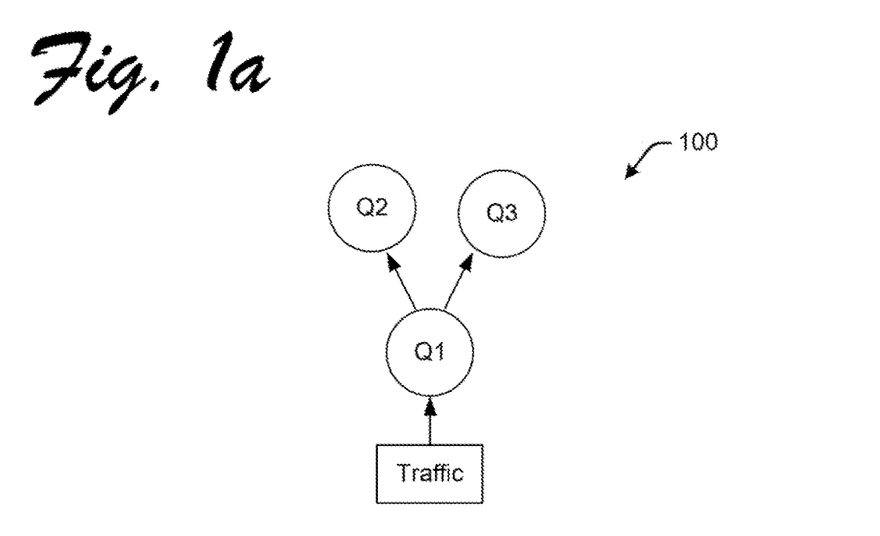
Figure 1B:
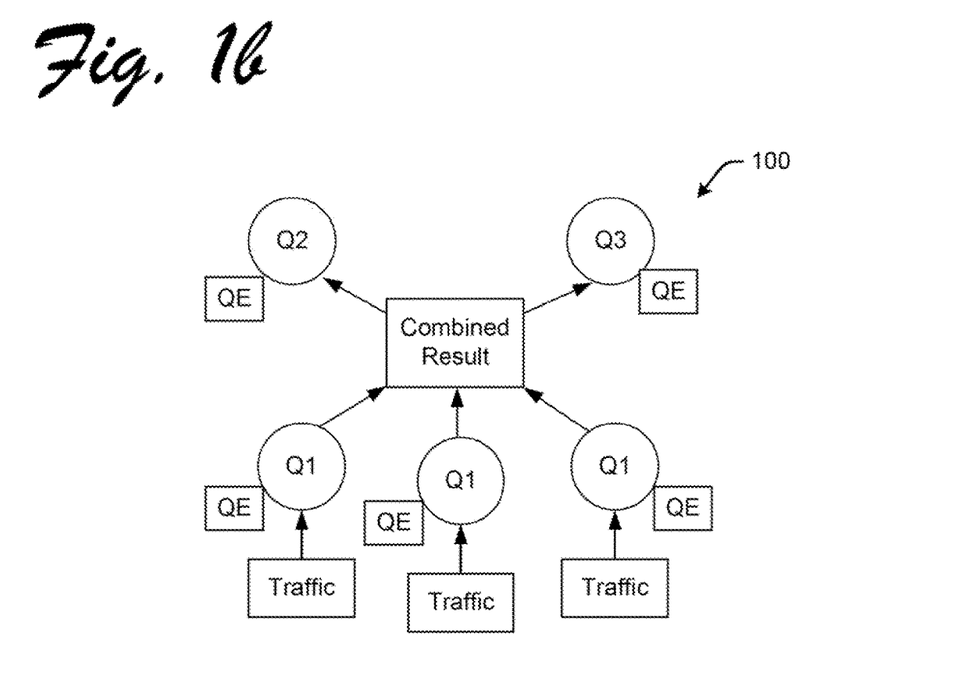

FIG. 1 are high-level diagrams illustrating (a) an example SQL dataflow process 100 with three queries Q1-Q3, and (b) a Query Engine (QE) net allocated to execute the process 100. In an example, the process may be implemented for network traffic analysis. The example includes three named queries (Q1, Q2 and Q3). The source table of Q1 is Traffic, with schema [tid, second, fromIP, toIP, bytes] describing the IP-to-IP network traffic records. Q1 retrieves the IP-to-IP network traffic records, and converts these records to minute-based, host-to-host traffic. The result of Q1 is forked to Q2 and Q3 for aggregation. The queries may be specified as follows:

```
Q1 :=   SELECT tid, FLOOR(time/60)::INTEGER AS minute,
        h1.host-id AS from-host, h2.host-id AS to-host, bytes
        FROM Traffic, hosts h1, hosts h2
        WHERE h1.ip = from-ip AND h2.ip = to-ip
Q2 :=   SELECT minute, from-host, to-host, SUM(bytes)
        FROM $Q1 GROUP BY minute
Q3 :=   SELECT minute, from-host, to-host, SUM(bytes)
        FROM $Q1 GROUP BY from-host, to-host
```

The queries may be executed by multiple distributed Query Engines (QEs). As illustrated in FIG. 1(b), traffic tuples are identified and hash partitioned by tid across three QE nodes, to be processed by three Q1 instances in parallel. The union of the results from all Q1 executions (denoted by $Q1) is sent to the QEs for Q2 and Q3 for further processing.

A unified distributed memory-based cache may be implemented across multiple server nodes as the data transfer platform, generically referred to herein as a Distributed Cache Platform (DCP). Data-intensive applications using databases to share data may use DCP for low-latency and scaled-out data caching. DCP data access is based on reading and writing a key-value store, and does not offer an interface with rich expressive power (e.g., SQL) or a unified data model (e.g., a relation model). As a result, applications build out richer semantics on top of DCP.

Figure 2:
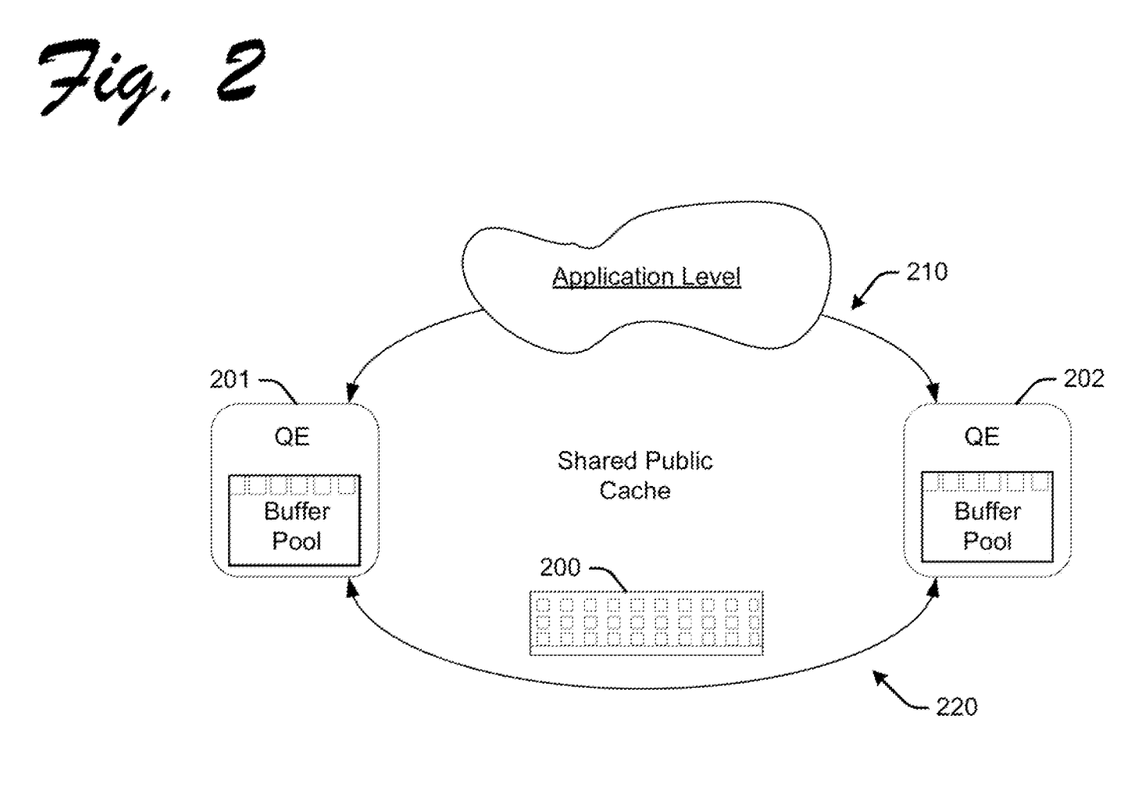
FIG. 2 is a high-level diagram illustrating a transfer query result directly as pages or blocks.

FIG. 2 is a high-level diagram illustrating a transfer query result directly as pages or blocks 200. Using DCP for data sharing and exchange between QEs (e.g., 201 and 202 in FIG. 2) has typically been at the application level (illustrated by cloud and the upper arc 210), and incurs significant overhead in data conversion and interpretation. For example, to take the result of a query Q1 as the input of another query Q2, the resulting tuple-set from Q1 is encoded as a CSV array, and then converted back to tuples before passing to Q2. Such an approach may not be suitable for every application, and can become a serious performance bottleneck when used for large or continuous data feeds.

Instead, the DCP binary protocol may be leveraged for transporting relation data directly at the storage level as pages or blocks at the storage layer (as illustrated by the lower arc 220 in FIG. 2). First, the QE is extended to integrate the database buffer pool with the DCP running on multiple memory nodes with high-speed inter-connections. The resulting architecture provides a unified database cache across distributed memory of multiple machines, and enables scaled-out, low-latency in-memory data access. The QE uses the normal buffer pool management mechanism to access and interpret the content stored in DCP, thus eliminating the need for a pair-wise application-level protocol, while overlaying the full SQL expressive power on DCP.

In addition, multiple distributed QEs may be used to provide a shared memory-based paradigm for their collaboration in a dataflow process with multiple correlated queries, by allowing a query to feed the result efficiently to another query through DCP. But instead of delivering a query result as an application layer "object", the query result relation is delivered and retrieved directly at the storage layer using a page-feed mechanism. That is, the producer query stores the result relation as pages or blocks in DCP through its buffer pool so that the consumer query can read these pages directly. The query result pages are emitted and retrieved with the binary protocol, and the tuples in these pages are in the format needed by the relational operators, this approach avoids overhead of application specific encoding/decoding. In addition, the use of an appropriate block size (e.g., page size) improves the efficiency of DCP access. Pushing data communication from the application layer down to the storage layer offers an effective solution for data transfer in QE net without an application level protocol.

The infrastructure may be implemented by integrating PostgreSQL's buffer management with DCP (e.g., Memcached), and by further extending the buffer pools of multiple PostgreSQL engines to DCP. This combination supports large scale, low-latency in-memory data access, as well as efficient communication among multiple collaborative QE's using the page-feed mechanism.

In an example, the buffer pool of a single QE may be utilized by multiple memory nodes. This leverages the rich expressive power of SQL and the mature data management capability of QE. This is different from building an in-memory data store from scratch. In a PostgreSQL database, each table is physically stored in the file system under a subdirectory. There are a number of files in that directory. A single file holds a predetermined amount of data (e.g., up to 1 GB of data) as a series of fixed-sized blocks (e.g., 8K pages) that is configurable. A tuple may not span multiple pages where a large tuple is sliced to multiple physical tuples.

A database buffer pool is a shared in-memory data structure, such as a simple array of pages or blocks, with each page entry pointing to a binary memory. A page in the buffer pool is used to buffer a block of data in the corresponding file, and may be identified by a tag serving as the identity of table space, relation, file and the sequence number of the block in the file. For example, the tag may have the form <table-space-id, relation-id, file-id, block#>. Maintaining the buffer pool allows the pages to be efficiently accessed in memory without going to disks.

The buffer pool may be accompanied by a corresponding array of data structures referred to herein as "buffer descriptors." Each buffer descriptor records the information for a page, such as the tag, usage frequency, last access time, whether the data is dirty (updated), and whether the buffer descriptor is extended (e.g., a newly allocated page being filled by inserted tuples to extend the relation). It is noted that an "extended" page may also be considered a "dirty" page.

When a query process needs a page corresponding to a specific file/block, the corresponding buffered page is pinned if the block is already cached in the buffer pool. If the block is not already cached in the buffer pool, a page slot is used to hold this data. If there are no free slots, the process selects a page to "evict" to make space for the requested page. If the page to be evicted is dirty, the page is written out to the disk asynchronously. Then the requested block on disk is read into the page in memory.

The pages may all start out "pinned" until the process that requested the data releases (or "unpins") the page. Determining which page to remove from the buffer pool to make space for a new one is a cache replacement issue. Thus, in an example a Least Recently Used (LRU) removal mechanism may be implemented. That is, the timestamp when each page was last used is maintained in the corresponding buffer descriptor so that the system can determine the LRU page. In another example, pages may be sorted in order of recent access. It is noted that other page eviction strategies may also be implemented, such as but not limited to Clock-Sweep and Usage-Count.

A DCP provides the unified cache view over multiple machine nodes, which allows multiple processes to access and update shared data. A DCP virtualizes the memories on multiple servers as an integrated memory. This provides simple APIs for key-value based data caching and accessing, such as get( ), put( ), and delete( ), where keys and values are objects.

Memcached is a general-purpose distributed memory caching system that provides a large hash table distributed across multiple machines, or memory nodes. The data are hash partitioned to these memory node. When the hash table on a node is full, subsequent insert causes LRU data to be purged. Memchached uses the client-server architecture. The servers maintain a key-value associative array, and the clients populate and query this array. Keys may be up to 250 bytes long and values, are generally up to about 1 megabyte in size. The clients are associated with all servers and use client side libraries to contact the servers. If a client needs to set or get the value corresponding to a certain key, the client library first computes a hash of the key to determine which server to use, and then contacts that server. The server computes a second hash of the key to determine where to store or read the corresponding value.

Figure 3:
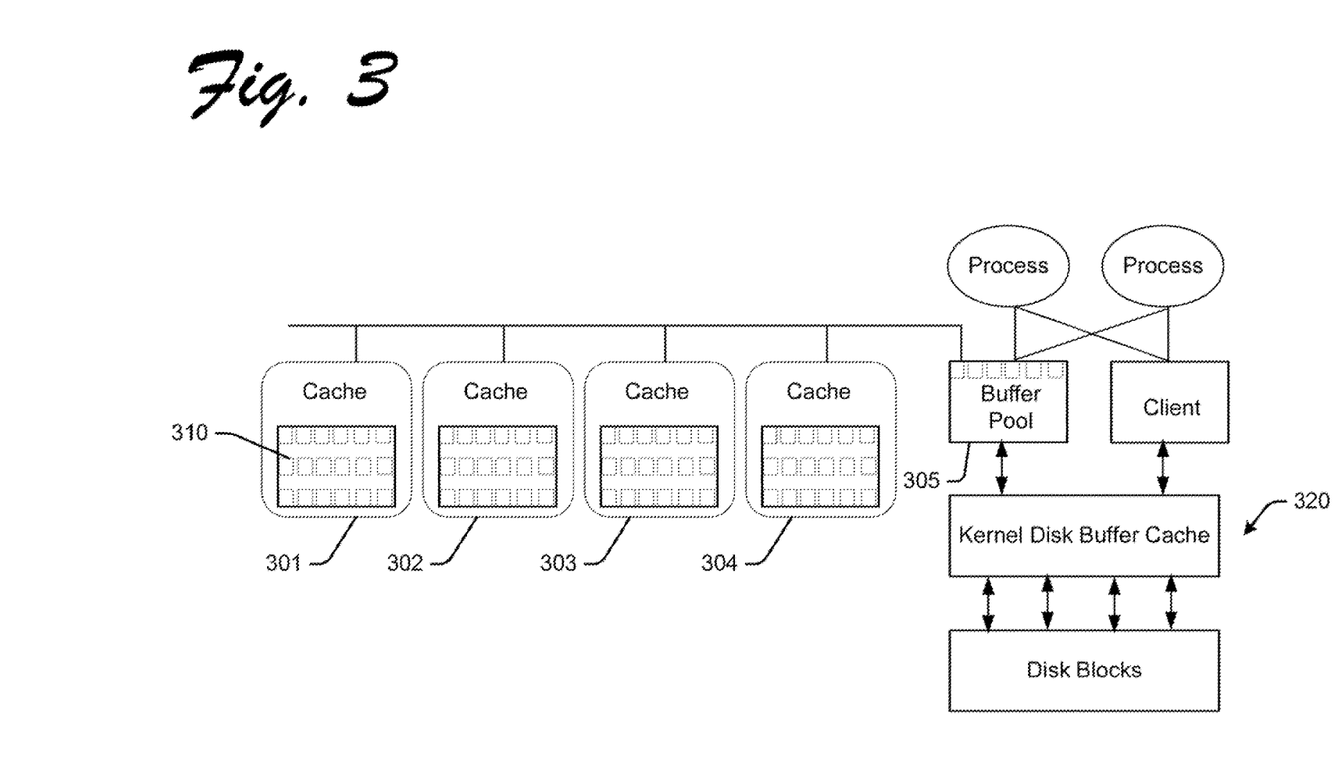
FIG. 3 is a diagram illustrating extending a PostgreSQL shared buffer pool to DCP.

FIG. 3 is a diagram illustrating extending a PostgreSQL shared buffer pool 300 to DCP. In integrating PostgreSQL QE with the Memcached-based DCP infrastructure, the QE acts as the DCP client that connects to the server pool 300 including multiple distributed Memcached servers 301-305. These servers cooperate in managing a unified in-memory hash table across multiple nodes. The buffered pages (e.g., 310) may be stored in such a unified hash table as key-value pairs to extend the buffer pool 300 with Memcached, where the pages 310 are hash partitioned to separate portions of the unified hash table residing on separate nodes.

In an example, mapping of a buffered page 310 to a key-value pair may be handled as follows. A tag for identifying a page (e.g., including the table-space-id, relation-id, file-id and the series number of the block in the file), is serialized to a string key. The mapping from the tag to a key is provided for Memcached access. The binary content of a page is treated as the value corresponding to the page key. This value is passed to the API functions of data transfer by the entry pointer plus the length (e.g., in bytes).

The buffer manager of the PostgreSQL engine may be extended to allow buffered pages to be moved to and retrieved from Memcached. The query engine acts as a DCP client. The buffered pages 310 may be sent to different physical Memcached sites based on the hash value of the page key. As a result, these pages are placed in multiple "memory nodes," but can be accessed with the unified interface.

A DCP cache is treated as additional buffer space for the database buffer pool 300, with all the concurrency control, page eviction management and file I/O handled by the database buffer pool manager. Any page to be cached in or retrieved from Memcached goes through the buffer pool manager.

Page buffering may be implemented using the overflow Model of Page Buffering. In this model, given a buffer pool B and the DCP buffering space D (physically located in distributed memory nodes), the unified page buffer is B ∪ D, and B ∩ D=empty. A page evicted from B is moved to D. Any page p, although can be moved between B and D, can only be pinned when p∈B. Page buffering may also be implemented using the Inclusion Model of Page Buffering. In this model, given the buffer pool B and the DCP buffering space D, the unified page buffer is B ∪ D, and B ⊆ D, if D is larger than B.

Figure 4:
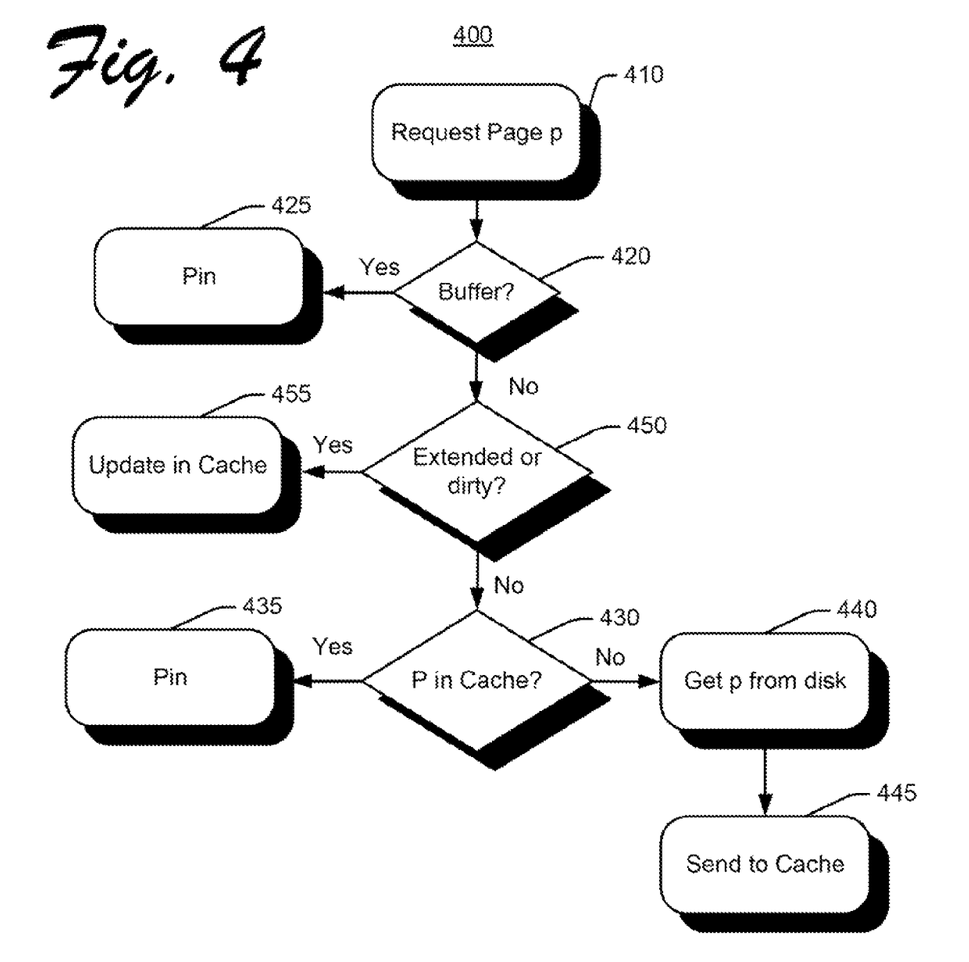
FIG. 4 is a flow diagram illustrating extending a buffer pool to DCP under an inclusion model.

FIG. 4 is a flow diagram 400 illustrating extending a buffer pool to DCP under an inclusion model. When a process requests 410 a page p, the system first tries to get the page from the local buffer pool at 420. If the page p is in the local buffer pool, then the page is pinned at 425. If the page p is not located in the local buffer pool, then the system attempts to get the page p from the DCP cache at 440 (pinning the page p at 435). If the page p is not in the DCP cache, then the page p is loaded from disk at 440 and sent to cache at 445.

According to the overflow model, when a LRU page is to be evicted from the buffer pool, the page is written to Memcached. If the page is dirty, then the page may also be "fsync'ed" to disk at 450. Accordingly, if a page is not in the buffer pool but in the Memcached, the page content in the Memcached is maintained up to date at 455.

In addition, when a page is loaded from a file, or newly inserted into the buffer pool, the page is also copied to the DCP without waiting until the eviction time. When a LRU page is evicted, if the page is dirty, then the page is written to the disk and also transmitted to DCP to refresh the copy in DCP. It is noted that a page still being updated or undergoing insertion, is pinned and may not be selected as the victim for eviction.

Selecting a model may depend at least to some extent on workload characteristics. For example, the inclusion model may out-perform the overflow model by avoiding writing every evicted page to Memcached. The inclusion model may also be used by multiple collaborative QEs to share the external pages in the DCP space. However, the disclosure herein is not limited to use with the inclusion model.

The preceding discussion has been based on extending the buffer pool to a single QE. This technique may also be extended to multiple QEs. For example, the buffer pools of multiple distributed QEs may be externalized to DCP for shared memory-based collaboration among the QEs in a dataflow process. An example is illustrated by FIG. 5, based on the SQL dataflow process example shown in FIG. 1.

Figure 5:
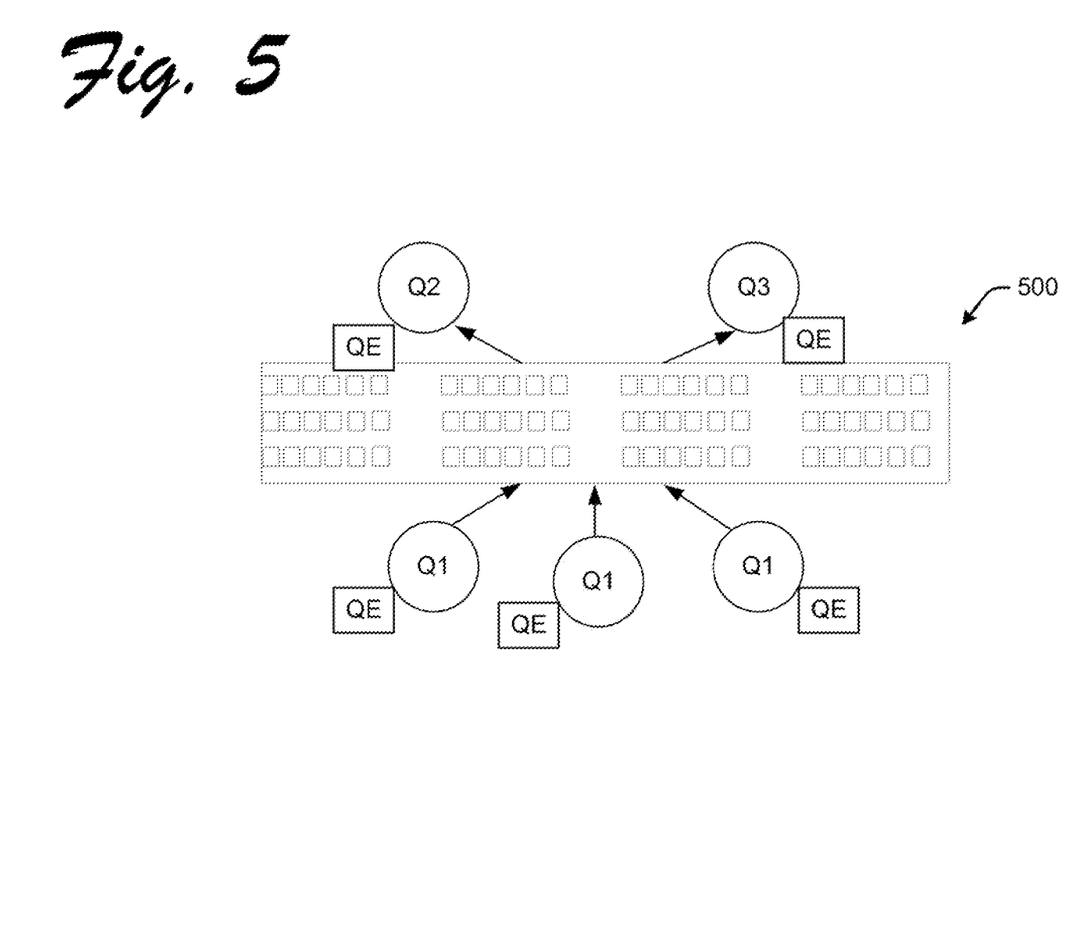
FIG. 5 is a diagram illustrating connecting queries and transferring results through DCP.

FIG. 5 is a diagram illustrating connecting queries Q1 and transferring results (e.g., to Q2 and Q3) through DCP 500. Relational query results may be delivered as value objects (e.g., CSV arrays, JDBC result objects) through DCP. However, because these objects are not in the physical data format of relations, the production and consumption incurs considerable data conversion overhead. For example, fetching CSV data from memory and converting these data to tuples to feed a query can be very slow.

Instead, a query result relation can be delivered and retrieved as pages or blocks, referred to as page-feed. Because pages or blocks are fix-length binaries, the pages can be transferred with commonly applicable binary protocols, while tuples in the pages are already in the format for the relational operators. Thus, this technique reduces the performance overhead of data encoding/decoding.

The page-feed approach assumes homogeneous QEs (e.g., all PostgreSQL engines). The specification of the collaborative SQL dataflow process is known to all participating QEs, such that the name of a query Q and the result relation $Q, are known, so $Q's schema is created at each related QE. The query result relations externalized or populated to DCP from the QEs, referred to as external relations, form a public data scope of the QEs where each QE still has its own private data scope. External relations reside in DCP.

To externalize a page as a key-value pair, the external key includes a site-id field for indicating the QE where the page is originated. The local relation ID is replaced by a globally known relation name. At each QE, paging is still handled by the local buffer manager, but only the local pages may be updated. The external pages are retrieved from DCP as read-only. For the external page generated locally, the mapping between a local tag and the external-key is provided.

There is a conceptual difference between scaling out the buffer pool of a single QE using DCP, and externalizing a query result relation to be shared by other QEs using DCP. In the former, a page in DCP is brought up to date only when it no longer exists in the buffer pool. In the latter, pages of an external relation in DCP are always up to date because the DCP is the primary place to share these pages.

These properties can be ensured using the Inclusion Model mechanism as follows. First, an external relation R is produced as a query result (e.g., Select * into R from T) of a query executed on the producer QE. Next, whenever a new page p of the external relation R is created and full with newly inserted tuples (or whenever the computation of R terminates), p becomes a regular page in the buffer pool and is immediately transferred to DCP to satisfy the Inclusion Model. After the query that produces R is completed, R as the input to other queries is read-only. So when R's pages are evicted from the consumer QE's buffer pool, updating the counterparts in DCP is not necessary. As a result, the content of R's pages in the DCP are maintained up to date at all times.

Figure 6:
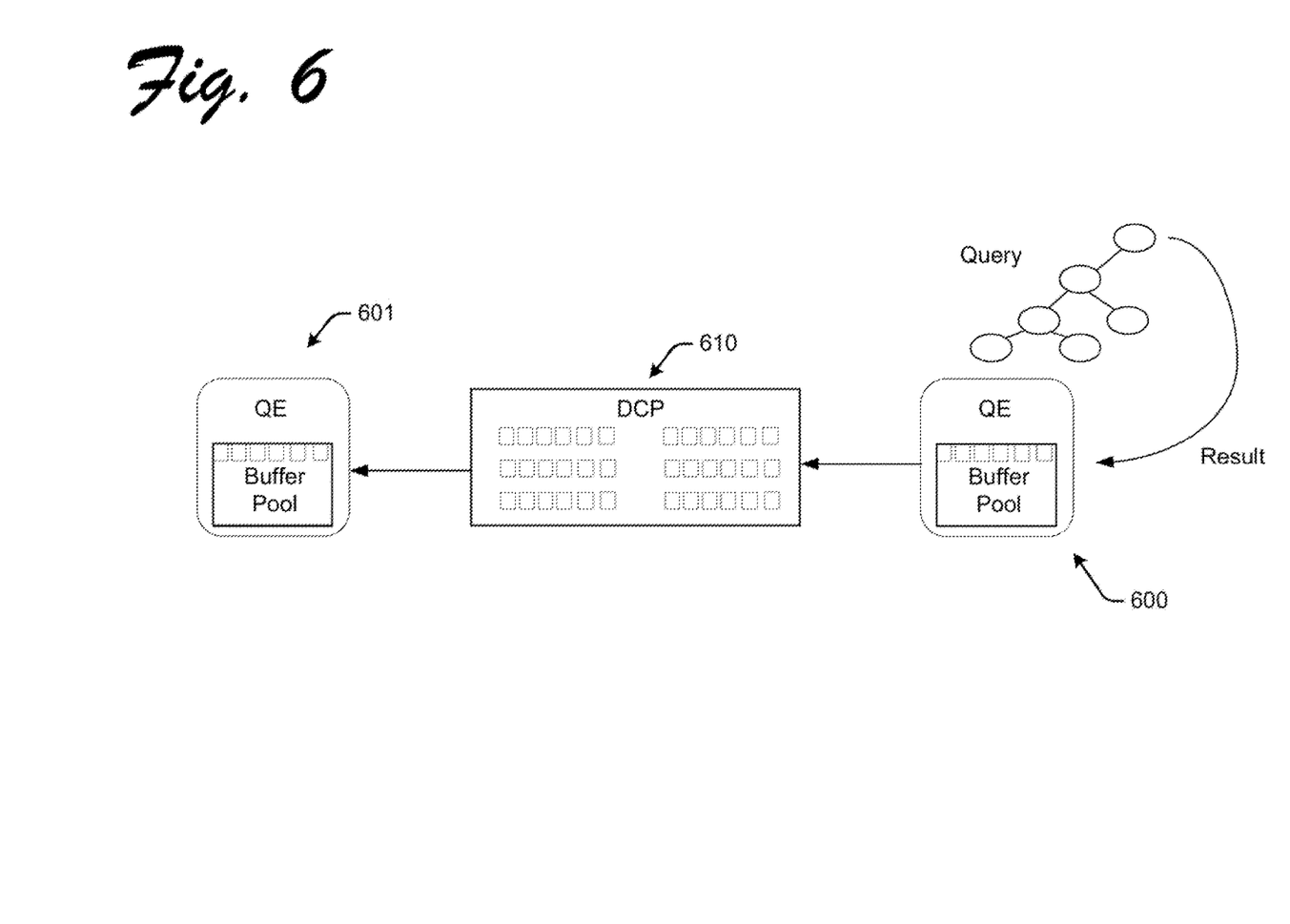
FIG. 6 is a diagram illustrating delivering query results in pages at the storage layer.

FIG. 6 is a diagram illustrating delivering query results from QE 600 to QE 601 in pages at the storage layer 610. In this example, given a query Q, the schema of the result relation $Q is created by the QE when the query plan is initiated. During execution, Q is connected to a "destination" or "receiver", typically a client connector (e.g., ODBC). However, the receiver of $Q can be a relation which is seen in the SELECT INTO case. When the query is expressed as SELECT INTO R, the relation R is buffered in the buffer pool of the producer QE. Then, because R's pages in the buffer pool are externalized to DCP across multiple nodes, the pages are visible to other queries running on the same or different QEs, and can be retrieved efficiently using in-memory data access.

The name Q can be assigned to a query participated in a SQL dataflow process, and the QE can convert a named query Q into a SELECT INTO query, and put the query result in the "into-relation" $Q, with its pages being held in the local buffer pool as well as externalized to the DCP to be accessed by distributed QEs. When a page is externalized to DCP, the tag (local ID) and content are converted to the following key-value pair.

For DCP access, the string key of a page may be serialized from <site-id, table-space-id, relation-name, file-id, block#>. Unlike the page key with a single QE, the site-id is introduced to identify the QE where the page originated, and the local relation-id is replaced by the commonly-known relation-name. Some fields, such as file-id, have no meaning at a foreign site, and are used solely for identification purpose. The mapping between the local tag of a page and its external-key is provided.

A query in the dataflow process may run in parallel at multiple sites with each generating a partition of the result relation with the same name. Such an implementation may be understood with the following illustration. Given an external relation, for each applicable site a site-specific master-key is generated by the relation-name R and site-id k, as R.k. A key-value pair <master-key, page-key-list> of R is created and stored in the DCP when the list is completed. Then for all the applicable sites (e.g., site 1 . . . 8) the page-key-lists of R, keyed by "R.1" . . . "R.8" are provided in the DCP. More specifically, at the site k, the pages of R are loaded to the DCP with the page keys maintained in a list. Then the list is itself loaded to DCP with R.k as the key. Because the site-ids and the resulting relation are known to every participating QE, the above site-specific master keys for a relation are known to all of QEs.

When R is to be retrieved from DCP by the consumer QE, the known list of site-ids, say, 1 . . . 8, are first used to compose master-keys, R.1 . . . R.8, which are in turn used by the consumer QE to retrieve (e.g., using the mget, or multi-get call) all the page keys belonging to R. These page keys are then used as keys to get the corresponding pages.

Before explaining how an external page cached in DCP is accessed, it helps to understand how a local page is accessed. A local page is identified by a tag <table-space-id, relation-id, file-id, block#>. A regular full-table-scan (FTS) first gets all the page tags from the system (e.g., Data Dictionary (DD) and indices), and then retrieves the corresponding pages through the storage engine.

In this example discussed, a query at a particular QE gets input data as an external relation (e.g., the results of other queries) from the physically distributed, but logically unified DCP cache space. Because the information about the external relation partitions on the foreign sites are not kept in the local Data Dictionary, the cache access cannot be guided by the local DD in the same way as a typical FTS.

Instead, the following cache access method may be used. Cache access to external pages may be handled by the buffer pool manager of the requesting QE, with the following constraints: only Full-Table-Cache-Scan (FTCS) is used, e.g., retrieving all pages of a relation from the DCP memory space, and FTCS is made on a read-only basis.

Figure 7:
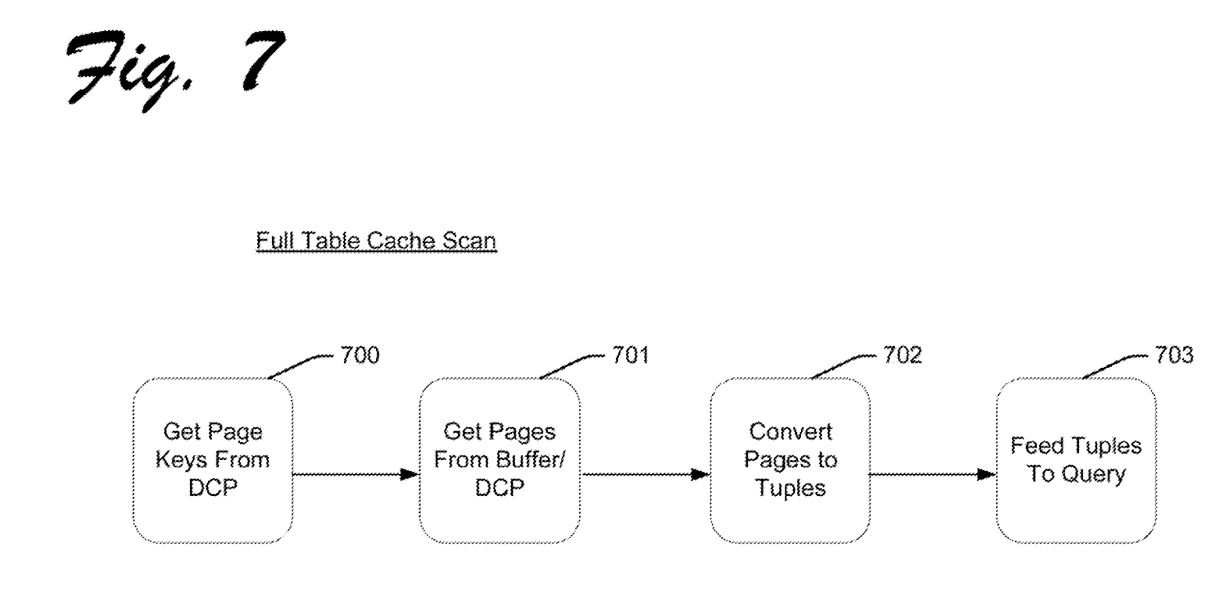
FIG. 7 is a diagram illustrating accessing query input as pages from DCP.

FIG. 7 is a diagram illustrating accessing query input as pages from DCP. As shown in FIG. 7, the Full Table Cache Scan first uses the master-keys of the requested relation R, to mget (multi-get) 700 from DCP all the page keys of R, with each including <site-id, table-space-id, relation-name, file-id, block#>. In the second phase 701, the FTCS gets the pages using these keys to the buffer pool of the requesting QE. The pages can be converted to tuples at 702 and fed to the query at 703.

EXAMPLES

The following examples are provided for purposes of illustration, and describe (a) extending a Postgres query engine's buffer pool to Memcached, and (b) to enable multiple Postgres query engines to share intermediate results of a SQL dataflow process.

This example uses synthetic data sets for a sample relation with three attributes, simulating different query workloads. The test environment used five Linux servers with Red Hat 4.1.2-50, 8G RAM, 400G disk and 4* Intel Xeon 2.8 GHz, inter-connected by Infiniband. One server was running PostgreSQL 9.0.3; the other four have Memcached installed. Each of the five systems was configured with a buffer cache size of at least one-fourth of the database size, while varying the database sizes from 50 MB to 10 GB. That is, Memcached was large enough to hold the entirety of tables.

The effect of extending the buffer pool of a single QE to DCP was tested. Two systems were compared: a conventional PostgreSQL engine with the regular buffer pool management, and the extended engine where the data are additionally buffered on the distributed Memcached servers. In this example the performance of disk scan was compared with DCP scan.

Results show that extending the buffer pool to DCP exhibited an average speedup ratio of 9.61, with the number of input tuples ranging from about 25 million to 200 million.

The performance comparison of sequential retrieval with update (query pattern: Update T Set T.x=x+v T.y=y+v) is shown on the right-hand side in FIG. 8. The average performance gains for varying database sizes ranged from about 4× to 7×. The query performance gain with DCP depends on the query workload characteristics. However the results indicated that there is good potential with a DCP-enlarged buffer pool.

The example also compared two different usages of DCP for delivering query results from one QE to another (query pattern: Select * from T). One usage went through the application layer, where the result of a query was inserted into DCP as a CSV array, then read by another query. This incurs data conversion overhead for each input tuple. The other usage implemented the page-feed approach described herein, and went through the storage layer directly to feed the receiving query the binary pages of the resulting relation. The results show an example performance gain using page-feed which significantly out-performed the application layer approach.

The systems and methods described herein extend the database buffer pool with a Distributed Caching Platform (DCP), externalize the buffered pages of multiple Query Engines (QEs), and transfer intermediate query results among the QEs directly through page-feed. These mechanisms support the scale-out, in-memory data caching for a QE, and the unified and efficient data communication among multiple QEs that execute a general graph-structured SQL dataflow processes. The QE net mechanism can be used to support data-intensive analytics, such as SQL based in-memory Map-Reduce.

The systems and methods disclosed herein may be implemented, for example, by integrating the PostgreSQL buffer pool and Memcached over distributed memory nodes. In contrast with the simple DCP stores, the full SQL interface and transactional semantics may be provided by leveraging and extending PostSQL on top of Memcachd.

In addition, the systems and methods disclosed herein push the QEs data communication from the application-oriented layer down to the system-oriented buffer pool layer. The fetching relation in pages preserves the system internal data format, and thus the proposed page-feed approach out-performs caching query results as "application objects" in DCP by reducing or altogether eliminating the data conversion overhead.

It is noted that the page-feed mechanism is also applicable to chunk-wise stream processing. That is, a continuous query may run cycle-by-cycle, (e.g., based on a data punctuation criterion such as a time boundary), to process the stream data chunk-by-chunk and generate chunk-wise query results. The page-feed is applied to the chunk-oriented query results. Our experience shows that the page-feed significantly out-performs the "tuple-feed" using a queue (e.g. a named pipe) in the throughput.

Before continuing, it should be noted that the examples described above are provided for purposes of illustration, and are not intended to be limiting. The components described herein are only for purposes of illustration of an example operating environment, and are not intended to limit implementation to any particular system. Other devices and/or device configurations may be utilized to carry out the operations described herein.

Operations described herein may be implemented in program code which may be executed by any suitable computing device. Program code used to implement features of the system can be better understood with reference to FIG. 10 and the following discussion of various example functions.

Figure 8:
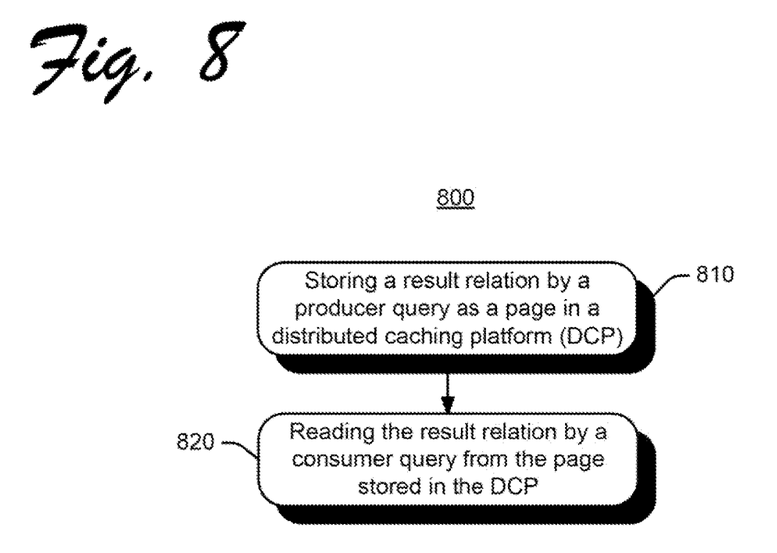
FIG. 8 is a flowchart illustrating example operations which may be implemented as page feed for efficient dataflow between distributed query engines.

FIG. 8 is a flowchart illustrating example operations which may be implemented as page feed for efficient dataflow between distributed query engines. Operations 800 may be embodied as logic instructions on one or more computer-readable medium. When executed on a processor, the logic instructions cause a general purpose computing device to be programmed as a special-purpose machine that implements the described operations.

In an example, the program code may be implemented in machine-readable instructions (such as but not limited to, software or firmware). The machine-readable instructions may be stored on a non-transient computer readable medium and are executable by one or more processor to perform the operations described herein. The program code executes the function of the architecture of machine readable instructions as self-contained modules. These modules can be integrated within a self-standing tool, or may be implemented as agents that run on top of an existing program code. However, the operations described herein are not limited to any specific implementation with any particular type of program code.

In an example page feed method, operation 810 includes storing a result relation by a producer query as a page in a distributed caching platform (DCP). Page size may be selected to balance efficiency of access to the DCP and query processing. Operation 820 includes reading the result relation by a consumer query from the page stored in the DCP.

The operations shown and described herein are provided to illustrate example implementations. It is noted that the operations are not limited to the ordering shown. Still other operations may also be implemented.

Still further operations may include, when requesting the page, first checking a local buffer pool for the page, then checking a cache if the requested page is not in the local buffer pool, then checking a disk if the requested page is not in the cache and the buffer pool. Operations may also include pinning the page if the page is found in the local buffer pool or the cache.

Operations may also include externalizing buffered pages of the distributed QEs. Intermediate query results may be transferred among the distributed QEs directly using page-feed. Using the page-feed preserves internal data format. In addition, relation data communication is handled at the storage level.

The operations may be implemented at least in part using an end-user interface. In an example, the end-user is able to make predetermined selections, and the operations described above are implemented on a back-end device to present results to a user. The user can then make further selections.

It is also noted that various of the operations described herein may be automated or partially automated.

It is noted that the examples shown and described are provided for purposes of illustration and are not intended to be limiting. Still other examples are also contemplated.

The invention claimed is:

1. A method comprising:
storing a query result relation resulting from a producer query as a local cached page in a query processor buffer pool of a first query processor, wherein the query result relation comprises a plurality of tuples returned by the producer query, wherein the plurality of tuples comprise data values from a first column of a first database table, wherein the query processor buffer pool is to store a plurality of local cached pages, wherein each of the plurality of local cached pages is a fixed-length binary page identified by a local tag;
sending, using a binary protocol, the local cached page to a distributed caching platform (DCP) to be shared as an external cached page, wherein the external cached page is visible as a data source of another query, wherein the DCP is distributed over multiple nodes, wherein the external cached page is identified by an external key that includes different data from the local tag;
reading, using the binary protocol, the external cached page by a second query processor based on the external key; and
converting the external cached page to the plurality of tuples for use by a consumer query.

2. The method of claim 1, wherein the local tag includes a local identifier of the query result relation.

3. The method of claim 2, wherein the local tag further includes a table space identifier, a file identifier, and a sequence number of the local cached page.

4. The method of claim 2, wherein the external key includes a global identifier of the query result relation.

5. The method of claim 4, wherein the external key further includes a site identifier.

6. The method of claim 1, further comprising:
in response to sending the local cached page to the DCP:
converting the local tag to the external key, wherein the external key is included in a key-value pair; and
converting content of the local cached page to a value included in the key-value pair.

7. The method of claim 6, further comprising storing the key-value pair in a unified hash table residing on multiple nodes.

8. The method of claim 1, wherein reading the external cached page by a second query processor comprises using a plurality of master keys for the query result relation.

9. The method of claim 8, wherein the plurality of master keys is composed using a known list of site identifiers for a plurality of sites.

10. A system comprising:
a first query processor including a query processor buffer pool to store a query result relation as a local cached page, wherein each local cached page stored in the query processor buffer pool is of uniform size, wherein the query result relation comprises a plurality of tuples returned by a first query, wherein each local cached page is a fixed-length binary page identified by a local tag;
a distributed caching platform (DCP) to receive, using a binary protocol, the local cached page to be shared as an external cached page, wherein the external cached page is visible as a data source of another query, wherein the DCP comprises at least one hardware processor, wherein the DCP is distributed over multiple nodes, wherein the external cached page is identified by an external key that includes different data from the local tag;

a second query processor to read, using the binary protocol, the external cached page from the DCP based on the external key, and to convert the external cached page to the plurality of tuples for use by a consumer query.

11. The system of claim 10, wherein the local tag is composed from a local identifier of the first query result relation, a table space identifier, a file identifier, and a sequence number of the local cached page.

12. The system of claim 10, wherein the external key comprises a global identifier of the query result relation and a site identifier.

13. The system of claim 10, wherein each local cached page stored in the query processor buffer pool is a fixed-length binary page.

14. The system of claim 10, wherein the DCP is further to:
convert the local tag to the external key, wherein the external key is included in a key-value pair;
convert content of the local cached page to a value included in the key-value pair; and
store the key-value pair in a unified hash table.

15. The system of claim 14, where local cached pages of the query processor buffer pool are hash partitioned to separate portions of the unified hash table residing on separate nodes.

16. The system of claim 10, wherein the second query processor is to read the external cached page using a plurality of master keys of the query result relation.

17. The system of claim 16, wherein the plurality of master keys is composed using a known list of site identifiers for a plurality of sites.

18. A system comprising:
a first query processor including a query processor buffer pool to store a query result relation as a local cached page, wherein each local cached page stored in the query processor buffer pool is a fixed-length binary page identified by a local tag, wherein the query result relation comprises a plurality of tuples returned by a first query;
a distributed caching platform (DCP) to receive, using a binary protocol, the local cached page to be shared as an external cached page, wherein the external cached page is identified by an external key that includes different data from the local tag, wherein the DCP comprises at least one hardware processor;
a second query processor to read, using the binary protocol, the external cached page from the DCP based on the external key.

19. The system of claim 18 wherein the DCP is further to:
convert the local tag to the external key, wherein the external key is included in a key-value pair; and
convert content of the local cached page to a value included in the key-value pair.

20. The system of claim 19 wherein the DCP is further to store the key-value pair in a unified hash table.

* * * * *